(12) United States Patent
Stieger et al.

(10) Patent No.: US 11,486,302 B2
(45) Date of Patent: Nov. 1, 2022

(54) TURBOSHAFT GAS TURBINE ENGINE AND EXPANSION RATIO RELATIONSHIP

(71) Applicants: ROLLS-ROYCE plc, London (GB); ROLLS-ROYCE DEUTSCHLAND LTD & CO KG, Blankenfelde-Mahlow (DE)

(72) Inventors: Rory D Stieger, Derby (GB); Mark D Taylor, Derby (GB); Erik Janke, Berlin (DE)

(73) Assignees: ROLLS-ROYCE plc, London (GB); ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 17/060,986

(22) Filed: Oct. 1, 2020

(65) Prior Publication Data

US 2021/0222617 A1   Jul. 22, 2021

(30) Foreign Application Priority Data

Oct. 23, 2019   (GB) ...................................... 1915309

(51) Int. Cl.
    *F02C 7/36*     (2006.01)
    *F02C 3/10*     (2006.01)
    *F02C 7/32*     (2006.01)

(52) U.S. Cl.
    CPC ............... *F02C 3/103* (2013.01); *F02C 7/36* (2013.01); *F02C 7/32* (2013.01); *F05D 2240/35* (2013.01)

(58) Field of Classification Search
    CPC ...... F02C 7/36; F02C 7/32; F02C 3/04; F02C 3/067; F02C 3/103; F05D 2220/62
    See application file for complete search history.

(56) References Cited

U.S. PATENT DOCUMENTS

| 3,255,586 | A | * | 6/1966 | Hennig | ...................... | F02C 9/52 |
| | | | | | | 60/773 |
| 4,215,553 | A | * | 8/1980 | Poirier | ...................... | F02C 1/05 |
| | | | | | | 165/104.34 |
| 4,384,639 | A | * | 5/1983 | Collin | .................... | B63H 23/08 |
| | | | | | | 192/218 |

(Continued)

FOREIGN PATENT DOCUMENTS

| EP | 2 192 291 A2 | 6/2010 |
| EP | 2 540 989 A2 | 1/2013 |
| GB | 1 477 061 A | 6/1977 |

OTHER PUBLICATIONS

Apr. 16, 2020 Search Report issued in British Patent Application No. GB1915309.7.

(Continued)

*Primary Examiner* — Steven M Sutherland
(74) *Attorney, Agent, or Firm* — Oliff PLC

(57) ABSTRACT

A turboshaft gas turbine engine comprises, in fluid flow series, a gas-generator compressor, a combustor, a gas-generator turbine, and a free power turbine. The expansion ratios of the turbines are dependent upon an outlet temperature of the combustor, and an expansion relationship between the turbines is defined as the ratio of expansion ratios of the turbines over a running range of non-dimensional power outputs of the gas turbine engine. A second derivative of the expansion relationship is from 0.6 to 1.0.

6 Claims, 8 Drawing Sheets

(56) References Cited

U.S. PATENT DOCUMENTS

| | | | | |
|---|---|---|---|---|
| 4,602,478 A | * | 7/1986 | Kelly | F01D 13/006 |
| | | | | 192/3.32 |
| 4,641,495 A | * | 2/1987 | Mowill | F02C 3/103 |
| | | | | 415/199.1 |
| 5,280,702 A | * | 1/1994 | Jaw | F02C 9/18 |
| | | | | 60/773 |
| 2006/0117756 A1 | * | 6/2006 | Wakeman | F01D 25/30 |
| | | | | 60/772 |
| 2009/0232676 A1 | | 9/2009 | Mowill | |
| 2010/0164234 A1 | * | 7/2010 | Bowman | F02C 7/32 |
| | | | | 290/1 R |
| 2010/0288571 A1 | * | 11/2010 | Dewis | F01K 3/02 |
| | | | | 180/165 |
| 2012/0167595 A1 | * | 7/2012 | Ottow | F01D 25/12 |
| | | | | 60/806 |

OTHER PUBLICATIONS

Mar. 2, 2021 Extended Search Report issued in European Patent Application No. 20201454.4.

* cited by examiner

TURBOSHAFT GAS TURBINE ENGINE AND EXPANSION RATIO RELATIONSHIP

TECHNICAL FIELD

This disclosure relates to turboshaft gas turbine engines, in particular gas turbine engines with a single-spool gas-generator and a free power turbine.

BACKGROUND

Turboshaft-configuration gas turbines are known. Single-spool turboshaft engines comprise a turbine which drives a compressor and the load, whilst in single-spool, free power turbine engines one turbine drives the compressor (forming a gas-generator spool) and another drives the load. Most turboshaft engines are designed to drive loads which require a fixed or synchronous speed (such as in electrical power generation) or operate according to a cube-law (such as ship propellers).

Such operational constraints on the engine often result in sub-optimal designs, as part load compressor surge margin is eroded due to the fixed output speed. This is particularly the case on the single spool, non-free power turbine arrangement, as the compressor is forced to operate at a constant non-dimensional speed ($N/\sqrt{T}$) despite a reduction in corrected flow ($W\sqrt{T}/P$). Whilst in the single-spool, free power turbine configuration there is no mechanical coupling between the load and the gas-generator, there is still an aerodynamic coupling between the turbines and thus compressor operability at part load is still affected to a degree.

It is therefore desirable to permit the free power turbine to vary in rotational speed. It is an object of the present invention to provide an optimal relationship between the expansion ratios of the gas-generator turbine and the free power turbine in a turboshaft engine in order to minimise fuel consumption.

SUMMARY

The invention therefore provides a turboshaft gas turbine engine comprising, in fluid flow series, a gas-generator compressor, a combustor, a gas-generator turbine, and a free power turbine;

wherein the expansion ratios of the turbines are dependent upon an outlet temperature of the combustor, and an expansion relationship between the turbines is defined as the ratio of expansion ratios of the turbines over a running range of non-dimensional power outputs of the gas turbine engine;

wherein a second derivative of the expansion relationship is from 0.6 to 1.0.

In an embodiment, the second derivative of the expansion relationship is from 0.7 to 0.9.

In an embodiment, the gas-generator turbine is a single-stage turbine and the free power turbine a single stage turbine.

In an embodiment, a ratio of a turbine blade stress parameter (AN2) of the gas-generator turbine to the turbine blade stress parameter of the free power turbine is from 0.7 to 2.3.

In an embodiment, said ratio of the turbine blade stress parameters is from 0.8 to 1.7.

In an embodiment, a ratio of a turbine disc stress parameter ($U/\sqrt{T}$) of the gas-generator turbine to the turbine disc stress parameter of the free power turbine is from 1 to 1.7.

In an embodiment, said ratio of the turbine disc stress parameters is from 1.3 to 1.4.

In an embodiment, the gas-generator turbine is a single-stage turbine and the free power turbine is a two-stage turbine.

In an embodiment, a ratio of the stress parameter (AN2) of the gas-generator turbine to the stress parameter of the second stage of the free power turbine is from 0.54 to 1.4.

In an embodiment, a ratio of the stress parameter (AN2) of the gas-generator turbine to the stress parameter of the second stage of the free power turbine is from 0.62 to 1.

In an embodiment, a ratio of a turbine disc stress parameter ($U/\sqrt{T}$) of the gas-generator turbine to the turbine disc stress parameter of the second stage of the free power turbine is from 0.92 to 1.5.

In an embodiment, said ratio of a turbine disc stress parameters is from 1.1 to 1.22.

In an embodiment, the gas-generator turbine comprises a stator having from 14 to 30 nozzle guide vanes.

In an embodiment, the gas-generator turbine comprises a rotor having from 30 to 60 turbine blades.

In an embodiment, a ratio of the number of nozzle guide vanes in the stator to the number of turbine blades in the rotor is from 0.23 to 1.

In an embodiment, the gas-generator turbine and the free power turbine are arranged to contra-rotate.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
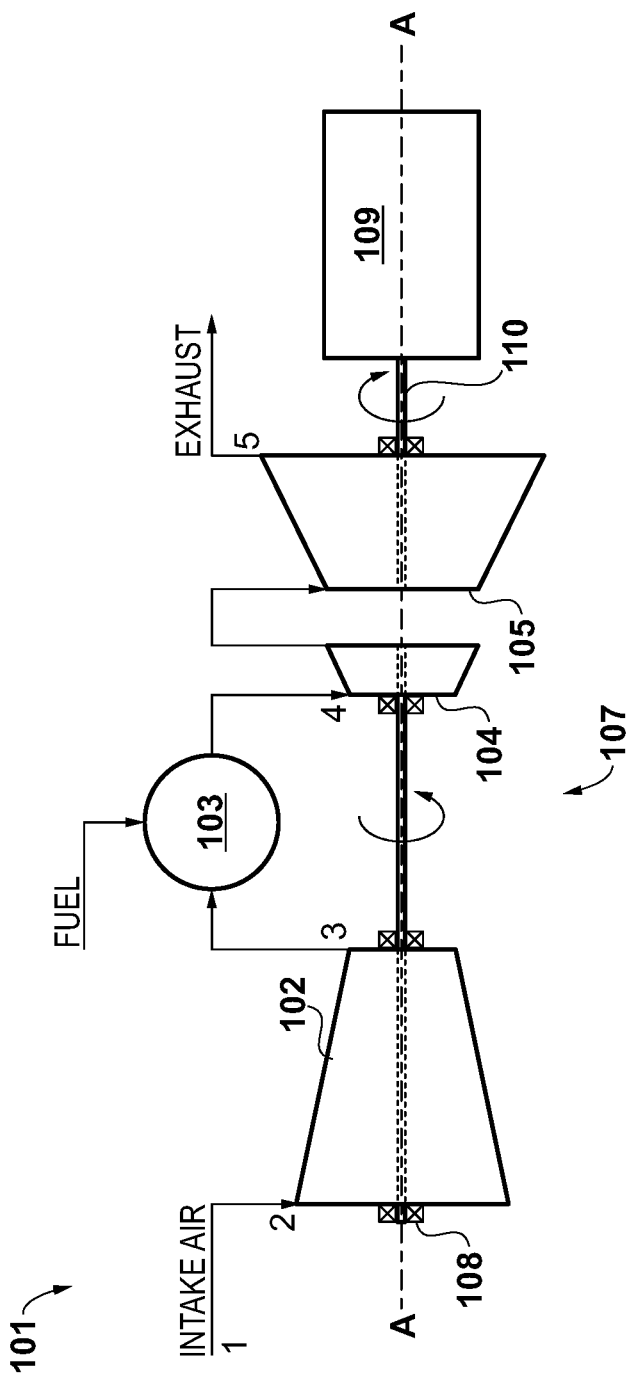
FIG. 1 is a block diagram illustrating an embodiment of a turboshaft gas turbine engine.

A block diagram illustrating an embodiment of a turboshaft gas turbine engine is shown in FIG. 1.

In FIG. 1, station numbering according to ARP 755A are provided. The engine, identified generally by numeral 101, comprises in fluid flow series a gas-generator compressor 102, a combustor 103, a gas-generator turbine 104, and a free power turbine 105. The gas-generator compressor 102 and the gas-generator turbine 104 are mechanically linked so as to rotate in unison around an engine centreline A-A by an interconnecting shaft 106, and together form a gas-generator spool 107. Bearings 108 support the gas-generator spool 107 relative to static structures of the engine 101. The free power turbine 105 is mechanically linked with a load 109 via an output shaft 110.

In operation, intake air is received at station 1 and enters the gas-generator compressor 102 at station 2. The air is compressed by the gas-generator compressor 102, and exits therefrom at station 3 where it is supplied to the combustor 103, mixed with fuel and ignited. The hot combustion products leave the combustor 103 at station 4 and are expanded through the gas-generator turbine 104, causing it to rotate and drive the compressor 102. At this point the flow exiting the gas-generator turbine 104 still comprises a significant amount of enthalpy, which develops work in the free power turbine 105, thereby driving the load 109.

In the present embodiment, the free power turbine 105 is configured to rotate around the engine centreline A-A. It will be appreciated that in alternative embodiments the free power turbine 105 may be located on an axis different from the engine centreline A-A.

In the present embodiment, the free power turbine 105 is configured to rotate in the opposite direction to the gas-generator turbine 104, i.e. they are arranged to contra-rotate. As will be described further with reference to FIG. 2 onward, this may reduce the amount of flow turning required between the turbine stages. However in alternative embodiments the free power turbine 105 may instead be configured to co-rotate with the gas-generator turbine 104.

In the present embodiment, the load 109 is a variable-speed load. For example, the load may be a load compressor for supplying compressed air, or the load may be a variable-frequency electrical generator, or any other variable-speed load or combinations thereof. It is contemplated that the engine 101 may be particularly well suited as an auxiliary power unit for an aircraft, in which it is tasked with providing compressed air for the cabin and electrical power for services on the aircraft.

In the configuration shown in FIG. 1, the gas-generator spool 107 and the combination of the free power turbine 105 and the load 109 are both able to vary in speed. In this way, fuel consumption and emissions may be reduced.

An embodiment the engine 101 with a single stage free power turbine will be described with reference to FIGS. 2 and 3. An embodiment the engine 101 with a two-stage free power turbine will be described with reference to FIGS. 4 and 5.

The speed relationship between the gas-generator turbine 104 and the free power turbine 105 will be described with reference to FIGS. 6 to 8.

Figure 2:
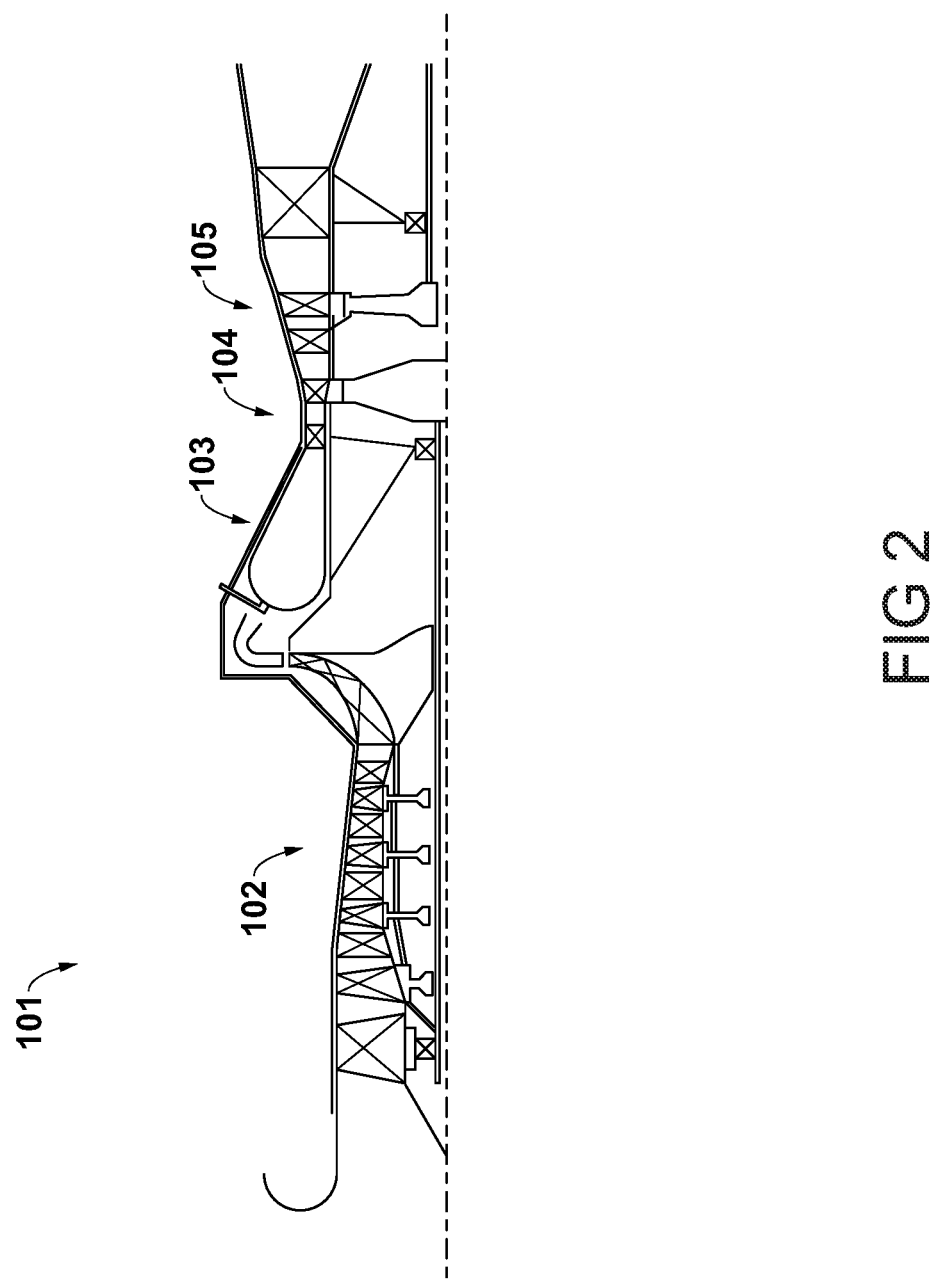
FIG. 2 is a general arrangement of the engine of FIG. 1 with a single stage free power turbine.

A general arrangement of a first embodiment of the engine 101 is shown in FIG. 2. For clarity, only the half of the engine above the centreline A-A is shown.

In the embodiment of FIG. 2 the compressor 102 is an axial-centrifugal compressor, and thus comprises a number of axial compression stages upstream of a final centrifugal stage. In this way, high pressure ratios may be achieved on the single gas-generator spool 107 without the attendant complexity and losses associated with ducting between two centrifugal stages. In the present embodiment, the design point pressure ratio of the compressor 102 is from 12 to 16. As used herein, the term "design point" for the engine 101 is the maximum rated power operating condition at International Standard Atmosphere sea level static conditions.

Figure 3:
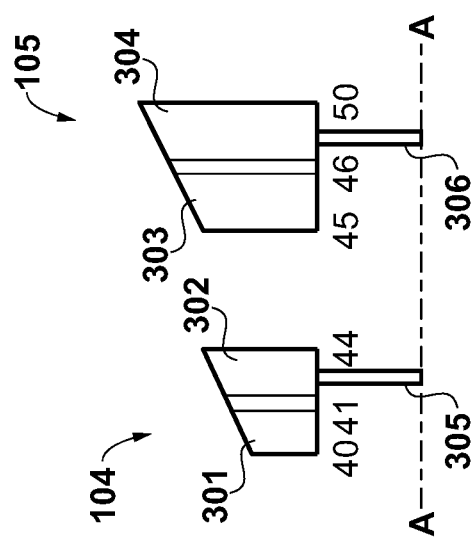
FIG. 3 shows the turbine arrangement of the engine of FIG. 1 with the single stage free power turbine.

Referring now to FIG. 3, which is a diagram showing the turbine arrangement of the engine 101, in the present embodiment the gas-generator turbine 104 is a single stage turbine, as is the free power turbine 105. Station numbers are provided in the Figure identifying the combustor exit 40, the stator outlet 41, the gas-generator rotor outlet 44, the free power turbine stator inlet 45, the free power turbine stator outlet 46, and the free power turbine exit 50.

In the present embodiment, the gas-generator turbine 104 is a high-work single stage turbine with a design point expansion ratio of from 4.5 to 5.5.

In an embodiment, the nozzle guide vanes 301 of the gas-generator turbine 104 are configured to have supersonic flow therethrough, whilst the blades 302 on the rotor are configured to have subsonic flow therethrough, thereby giving a degree of reaction less than 0.5, in particular from around 0.15 to 0.4, for example 0.3. This configuration results in a specific work of around from 200 to 290 kilojoules per kilogram, for example 260 kilojoules per kilogram, which is suitable for a lower pressure ratio design compressor, i.e. about 10 to 14.

In another embodiment, both the nozzle guide vanes 301 and the rotor blades 302 of the gas-generator turbine 104 are configured to have supersonic flow therethrough, thereby giving a degree of reaction of from around 0.4 to 0.55, for example 0.47. This configuration results in a specific work of from around 290 to 650 kilojoules per kilogram, for example 320 kilojoules per kilogram, which is suitable for a higher pressure ratio design compressor, i.e. about 14 to 16.

In an embodiment, the gas-generator turbine 104 comprises from 14 to 30 nozzle guide vanes 301. In an embodiment, the rotor of the gas-generator turbine 104 comprises from 30 to 60 blades 302. In an embodiment, the ratio of the number of nozzle guide vanes 301 to the number of blades 302 on the rotor is from 30 to 60. This provides a highly efficient gas-generator turbine stage. In a specific example, 20 nozzle guide vanes and 45 blades are provided, giving a ratio therebetween on 0.44.

As described previously, in the present embodiment the free power turbine 105 is also a single stage turbine, however is configured with a lower specific work and subsonic flow. In this embodiment, the free power turbine 105 has a design point expansion ratio of from 1.5 to 2.5.

As described previously, in the present embodiment the turbines are configured to contra-rotate; this is due to the high degree of exit swirl in the flow exiting the gas-generator turbine, and therefore relaxes the degree of flow turning required by the free power turbine nozzle guide vanes 303, and does not necessitate a further inter-stage vane.

The rotational speeds in revolutions per minute N of the gas-generator turbine 104 and the free power turbine 105 ($N_1$ and $N_2$ respectively) in combination with the annulus areas A at their rotor exit stations 44 and 50 ($A_{44}$ and $A_{50}$ respectively) together define a blade stress parameter according the formula $AN^2$. Thus the blade stress parameter of the gas-generator turbine 104 may be found by evaluating $A_{44}N_1^2$, and the blade stress parameter of the gas-generator turbine 105 may be found by evaluating $A_{50}N_2^2$.

In the present embodiment, the respective blade stress parameters of the two single-stage turbines, $A_{44}N_1^2$ and $A_{50}N_2^2$, are related. In an embodiment the ratio of the blade stress parameter of the gas-generator turbine $A_{44}N_1^2$ to the blade stress parameter of the free power turbine $A_{50}N_2^2$ is from 0.7 to 2.3 which overall provides a highly efficient turbine. In a specific embodiment, the said ratio is from 0.8 to 1.7.

Further, the meanline (i.e. mid-span) blade speed in metres per second U of the gas-generator turbine rotor blades 302 and the free power turbine rotor blades 304 ($U_1$ and $U_2$ respectively), in combination with the gas temperatures for each rotor stage ($T_{41}$ and $T_{46}$ respectively), together define a disc stress parameter according the formula $U/\sqrt{T}$, i.e. the corrected meanline blade speed of the respective turbine blades. This measure is indicative of the stress experienced by, respectively, the gas-generator turbine disc 305 and the free power turbine disc 306. The disc stress parameter of the gas-generator turbine 104 may be found by evaluating $U_1/\sqrt{T_{41}}$, and the disc stress parameter of the gas-generator turbine 105 may be found by evaluating $U_2/\sqrt{T_{46}}$—station 46 being the trailing edge of the free power turbine nozzle guide vane 303.

In the present embodiment, the respective disc stress parameters of the two single-stage turbines, $U_1/\sqrt{T_{41}}$ and $U_2/\sqrt{T_{46}}$, are related. In an embodiment the ratio of the disc stress parameter of the gas-generator turbine $U_1/\sqrt{T_{41}}$ to the disc stress parameter of the free power turbine $U_2/\sqrt{T_{46}}$ is from 1 to 1.7 which overall provides a highly efficient turbine. In a specific embodiment, the said ratio is from 1.3 to 1.4.

Figure 4:
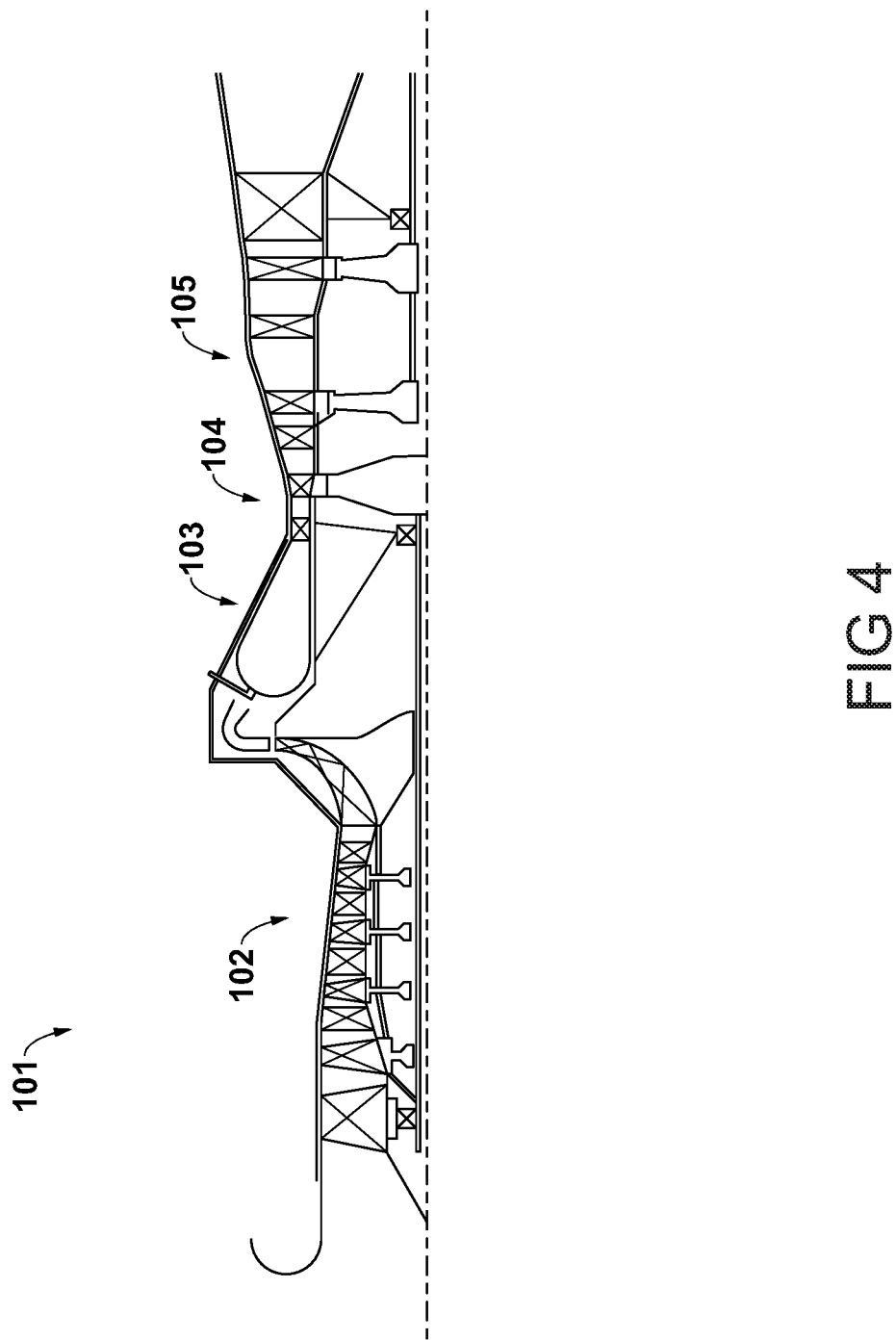
FIG. 4 is a general arrangement of the engine of FIG. 1 with a two stage free power turbine.

A general arrangement of a second embodiment of the engine 101 is shown in FIG. 4. Again, for clarity, only the half of the engine above the centreline A-A is shown.

In this embodiment the engine 101 is the same as that illustrated in FIG. 2, albeit in this embodiment a two-stage free power turbine 105 is used. Whilst the single-stage turbine is lighter, the two-stage free power turbine does permit a lower loading and thus higher efficiency and potentially a higher maximum power output. In this embodiment, the free power turbine 105 has a design point expansion ratio of from 1.5 to 2.5 i.e. the same as for the single stage configuration described previously, albeit achieved across two stages rather than one.

Figure 5:
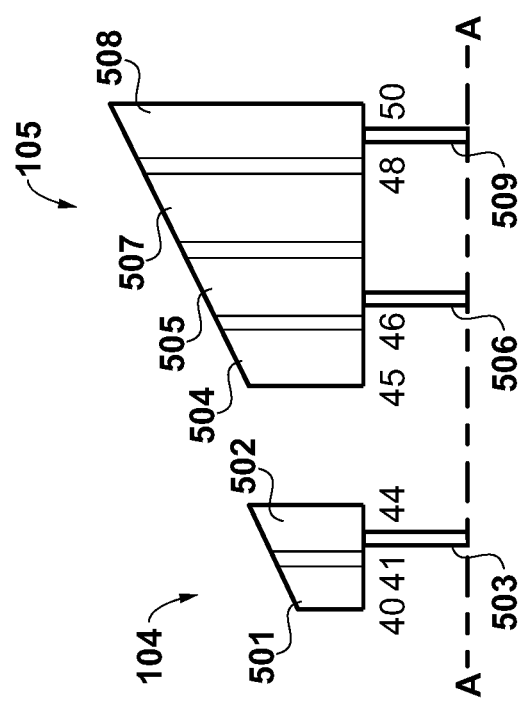
FIG. 5 shows the turbine arrangement of the engine of FIG. 1 with the two stage free power turbine.

FIG. 5 is a similar diagram to FIG. 3, and shows the gas-generator turbine 104 and the free power turbine 105 for this second embodiment of the engine 101.

The gas-generator turbine may be configured in a similar manner to that previously described with reference to FIG. 3, and thus may adopt any of the features disclosed above.

As with the first embodiment, the gas-generator turbine 104 has nozzle guide vanes 501 and blades 502 on the rotor, supported by a disc 503. In this embodiment the free power turbine 105 is a two-stage turbine, comprising first stage nozzle guide vanes 504, blades 505 on the first stage rotor supported by a first stage disc 506, second stage nozzle guide vanes 507, blades 508 on the second stage rotor supported by a second stage disc 509.

In an embodiment the ratio of the blade stress parameter of the gas-generator turbine $A_{44}N_1^2$ to the blade stress parameter of the free power turbine $A_{50}N_2^2$ is from 0.54 to 1.4 which overall provides a highly efficient turbine. In a specific embodiment, the said ratio is from 0.62 to 1.

In an embodiment the ratio of the disc stress parameter of the gas-generator turbine $U_1/\sqrt{T_{41}}$ to the disc stress parameter of the free power turbine $U_2/\sqrt{T_{48}}$ (station 48 being the trailing edge of the second stage nozzle guide vanes 507) is from 0.92 to 1.5 which overall provides a highly efficient turbine. In a specific embodiment, the said ratio is from 1.1 to 1.22.

Figure 6:
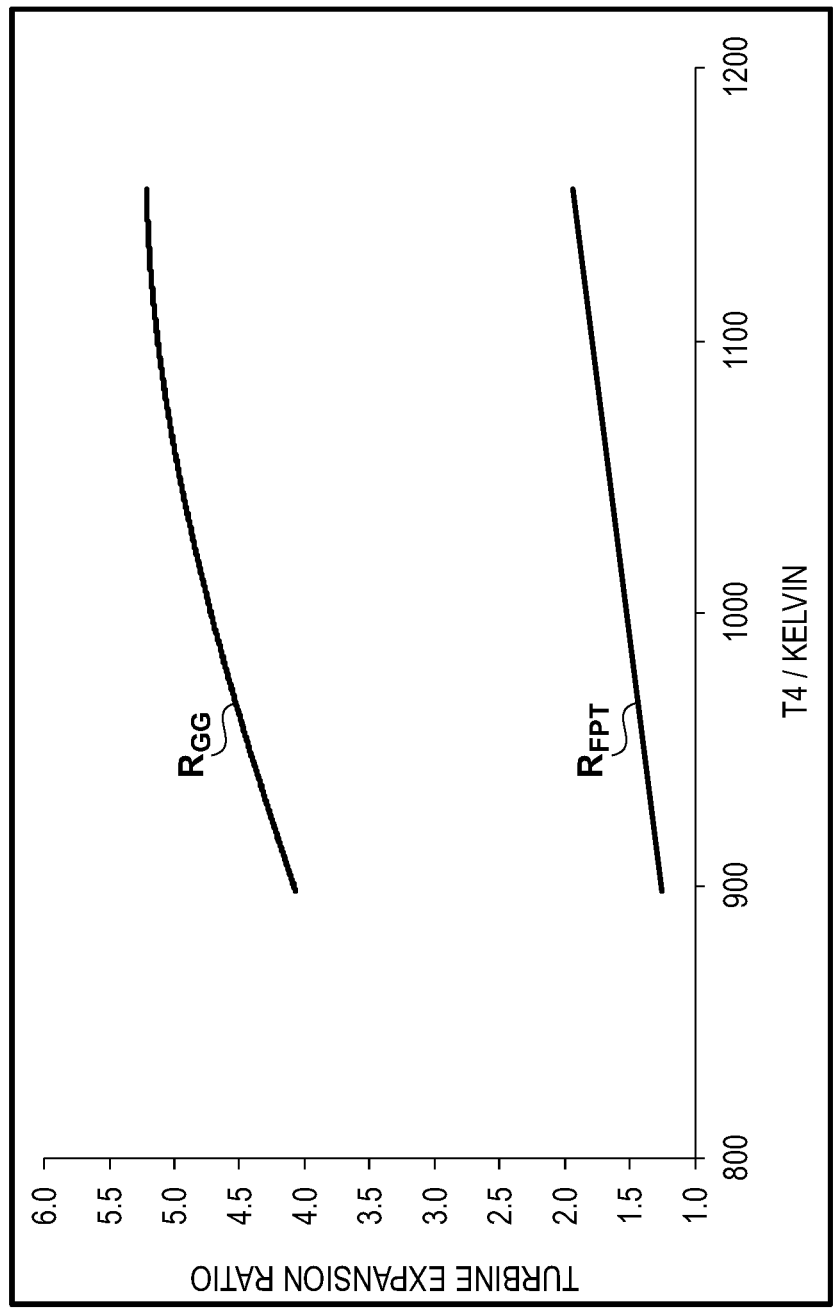
FIG. 6 is a chart showing turbine expansion ratio with respect to combustor outlet temperature ($T_4$)

A chart showing the expansion ratios of the gas-generator turbine 104 and the free power turbine 105 ($R_{GG}$ and $R_{FPT}$ respectively) as a function of the combustor outlet temperature $T_4$ in kelvin is shown in FIG. 6. As can be seen, in the engine 101 the expansion ratios of the turbines $R_{GG}$ and $R_{FPT}$ are both dependent upon an outlet temperature of the combustor.

Figure 7:
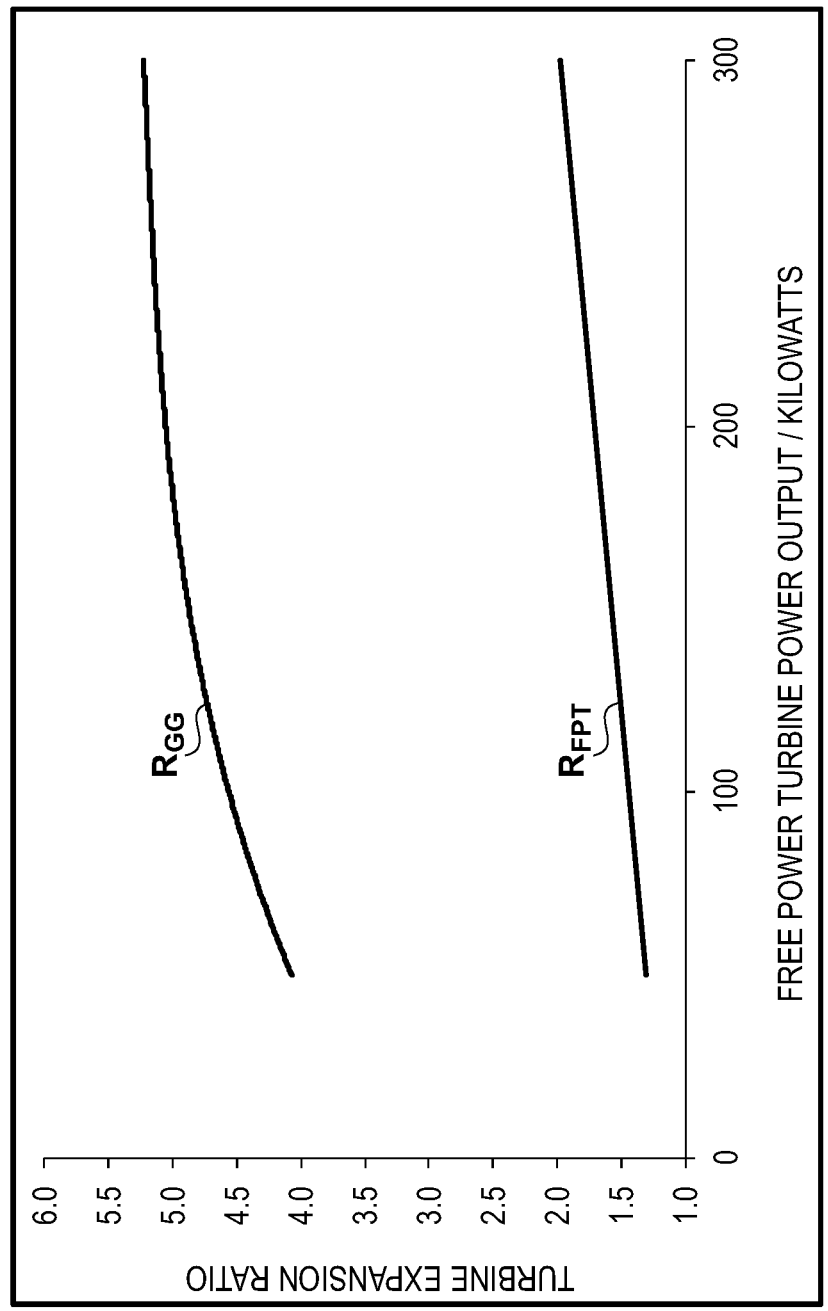
FIG. 7 is a chart showing turbine expansion ratio with respect to free power turbine shaft non-dimensional power output.

A chart showing the expansion ratios $R_{GG}$ and $R_{FPT}$ as a function of the non-dimensional power output in watts of the free power turbine is shown in FIG. 7. As can be seen, in the engine 101 the expansion ratios $R_{GG}$ and $R_{FPT}$ of the turbines both vary in concert with the non-dimensional power output of the free power turbine 105.

Figure 8:
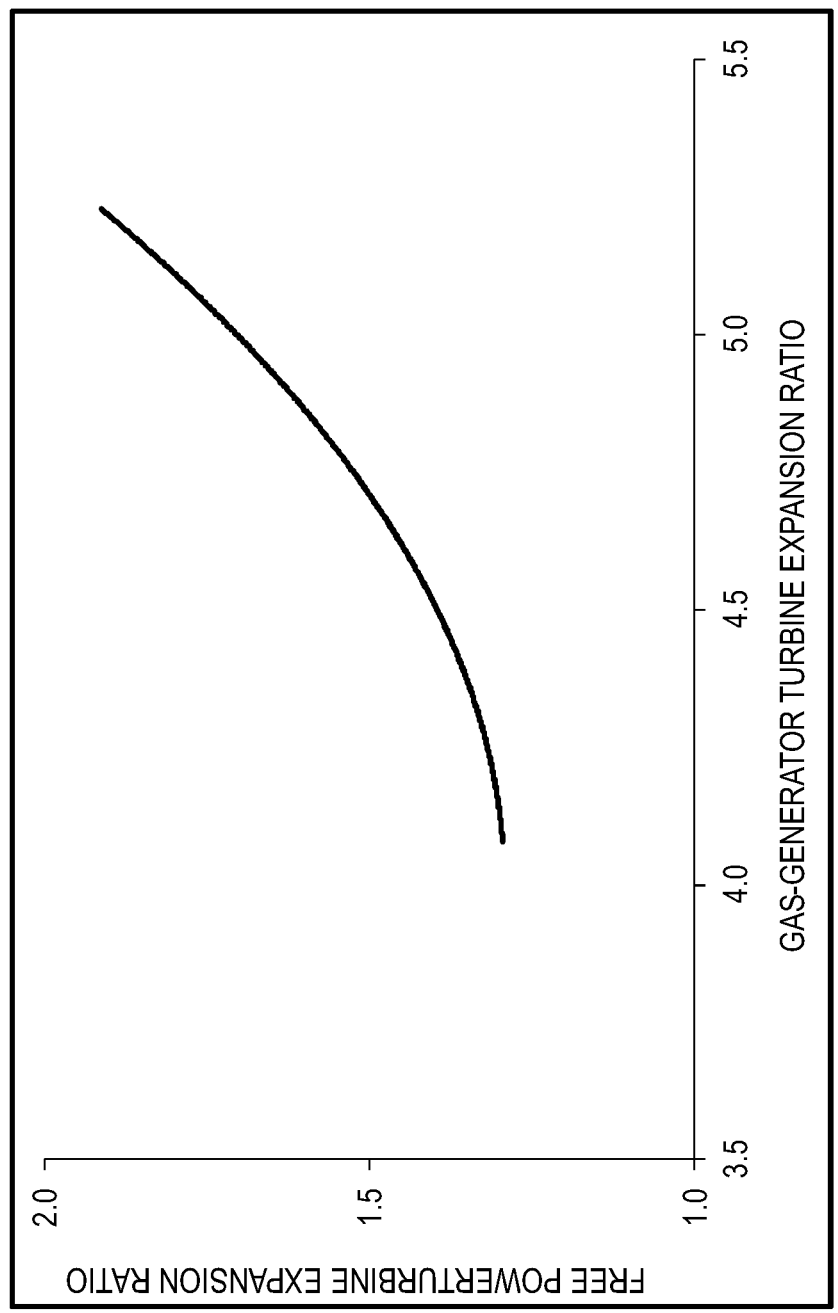
FIG. 8 is a chart showing free power turbine expansion ratio with respect to gas-generator expansion ratio.

A chart showing $R_{FPT}$ as a function of $R_{GG}$ is shown in FIG. 8. As can be seen, over the range of non-dimensional power outputs of the free power turbine 105, the expansion ratios of the gas-generator turbine 104 and the free power turbine 105 increase monotonically. Indeed, it has been found that maintaining the relationship quadratic in the manner shown in the chart of FIG. 8 provides a highly efficient turbine system. We may therefore define an expansion ratio relationship between the turbines as the ratio of expansion ratios ($R_{FPT}$:$R_{GG}$) of the turbines over a running range of non-dimensional power outputs of the engine 101. As can be seen from the chart of FIG. 8, $R_{FPT}$ is a quadratic function of $R_{GG}$, and thus the ratio between them is a quadratic mapping It can be shown that optimal efficiency is possible by constraining the relationship between the expansion ratios of the gas-generator turbine 104 and the free power turbine 105 such that the second derivative of the quadratic function mapping said expansion ratios to one another lies in a certain range. The inventors have surprisingly found that efficiency is particularly optimal over the range of non-dimensional power outputs of the free power turbine 104 if this second derivative is constrained within the range of from 0.6 to 1.0. Particularly high efficiency is found in the second derivative of the speed lies in the range of from 0.7 to 0.9, and even more particularly from 0.76 to 0.86. In the present implementation, the second derivative is constrained to be 0.82, resulting in optimal specific fuel consumption from idle to maximum power.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:
1. A turboshaft gas turbine engine comprising:
a gas-generator compressor, the gas-generator compressor being an axial-centrifugal compressor having
at least one axial compression stage,
a final centrifugal compression stage downstream of the at least one axial compression stage, and
a design point pressure ratio in a range from 12 to 16, the design point pressure ratio being a pressure ratio of the gas-generator compressor when the turboshaft gas turbine engine is operating at a maximum rated power at International Standard Atmosphere sea level static conditions;
a combustor;
a gas-generator turbine having a design point expansion ratio in a range from 4.5 to 5.5, the design point expansion ratio being an expansion ratio of the gas-generator turbine when the turboshaft gas turbine engine is operating at the maximum rated power at the International Standard Atmosphere sea level static conditions; and
a free power turbine, wherein
the gas-generator compressor, the combustor, the gas-generator turbine, and the free power turbine are in fluid flow series, and
an expansion relationship between the turbines is defined as the ratio of the expansion ratio of the free power turbine to the expansion ratio of the gas-generator turbine ($R_{FPT}$:$R_{GG}$) over a running range of power outputs of the gas turbine engine.
2. The gas turbine engine of claim 1, wherein:
the gas-generator turbine is a single-stage turbine; and
the free power turbine is a two-stage turbine.

3. The gas turbine engine of claim 2, in which the gas-generator turbine comprises a stator having from 14 to 30 nozzle guide vanes.

4. The gas turbine engine of claim 2, in which the gas-generator turbine comprises a rotor having from 30 to 60 turbine blades.

5. The gas turbine engine of claim 2, in which a ratio of the number of nozzle guide vanes in a stator to the number of turbine blades in a rotor is from 0.23 to 1.

6. The gas turbine of claim 1, in which the gas-generator turbine and the free power turbine are arranged to contra-rotate.

* * * * *